United States Patent
Treffers et al.

[11] Patent Number: 5,940,071
[45] Date of Patent: Aug. 17, 1999

[54] METHOD AND APPARATUS FOR SCHEDULING THE AVAILABILITY OF MOVIES-ON-DEMAND AND INTERACTIVE SERVICES

[75] Inventors: Menno A. Treffers; Elisabeth F. M. Steffens; Antonius T. M. Grommen, all of Eindhoven, Netherlands

[73] Assignee: U.S. Philips Corporation, New York, N.Y.

[21] Appl. No.: 08/673,834

[22] Filed: Jun. 27, 1996

[30] Foreign Application Priority Data

Jun. 30, 1995 [EP] European Pat. Off. ............. 95201795

[51] Int. Cl.$^6$ ........................................... H04N 7/173

[52] U.S. Cl. ............................. 345/327; 348/12; 455/5.1

[58] Field of Search ................................ 348/6, 7, 11, 12, 348/13; 455/3.1, 4.1, 4.2, 5.1, 6.1; 345/327; H04N 7/16, 7/173

[56] References Cited

U.S. PATENT DOCUMENTS

| | | | |
|---|---|---|---|
| 5,357,276 | 10/1994 | Banker et al. | 348/7 |
| 5,359,601 | 10/1994 | Wasilewski et al. | 348/906 |
| 5,371,532 | 12/1994 | Gelman et al. | 348/7 |
| 5,559,548 | 9/1996 | Davis et al. | 348/6 |
| 5,600,573 | 2/1997 | Hendricks et al. | 348/6 |
| 5,671,225 | 9/1997 | Hooper et al. | 348/6 |

*Primary Examiner*—Chris Grant
*Attorney, Agent, or Firm*—Gregory L Thorne

[57] ABSTRACT

Service items at a central authority are scheduled as to their selective availability upon user request at remote stations. These are bidirectionally connected to the central authority. Each service item is assigned to one or more structures of items. Each structure of items is assigned to one or more of a set of navigation contexts. One unique start instant in absolute time is assigned to each respective navigation context. Upon attaining of any such start instant, all service items assigned to the associated navigation context are rendered available unto a detected request.

11 Claims, 3 Drawing Sheets

METHOD AND APPARATUS FOR SCHEDULING THE AVAILABILITY OF MOVIES-ON-DEMAND AND INTERACTIVE SERVICES

BACKGROUND TO THE INVENTION

The invention relates to a method for providing services in a computerized system that includes a storage system for data pertaining to the services. The classical method of rendering such services is by one-time broadcast which is scheduled on each separate broadcast channel. Each repetition of a particular program item must again be scheduled separately. Recently, two new trends in service rendering have come up. The first relies on the providing of multiple channels in parallel, so that the number of service items may increase by orders of magnitude; also, the channels need no longer be one-to-many. A still more important trend is interactivity, so that the physical usage of the channel(s) is at least codetermined by actual requests by the user at the remote station.

Both aspects complicate the scheduling of the availability of the service items that may come in a broad variety, such as movies, music, games, data transfer, chatter-boxes, home-shopping services and various others. Such scheduling must adhere to various restrictions, such as government regulations, time dependency of the presence and wishes of diverse user person categories, the minimum time necessary for the rendering of a particular service item, and many others. Also, the scheduling operation should be as simple as reasonably possible to avoid errors and to minimize the effort necessary for implementation thereof.

SUMMARY TO THE INVENTION

Therefore, amongst other things it is an object of the present to provide a method according to the preamble, that allows for straightforward, easy and consistent scheduling even in a complex and frequently varying environment that may contain a large and diverse set of service items. Now, according to one of its aspects, the invention is characterized in that the method comprises:

creating and storing an inventory of the information services, including a unique identification of each information service and a reference to data required to provide the information service to a customer;

creating and storing at least one navigation context;

for each navigation context, creating and storing at least one service menu;

associating each service menu with zero or more information services;

assigning and storing a unique availability start time for each navigation context;

automatically selecting, upon request by a service provider, a service customer, or an automated system, the navigation context with the most recent availability start time, as calculated from the time of the request, to function as unique current navigation context;

making available only the service menus associated with the current navigation context, and the information services associated with these service menus. The most recent one among said start instants will immediately define the validity of a single navigation context as the current one, and the associating of the service menus and service items to a particular navigation context will define the availability of the associated service items. The items and/or menus may be structured according to lists, trees, or directed graphs. Each of these structurings allows in various operational environments for respectively optimal navigation facilities. The request may be by the user or customer, by the service provider, or by a different automated system, such as a broadcast operator.

In a simplified setup, the intermediate structuring by for each navigation context, creating and storing at least one service menu, is foregone. Upon detecting of a request, the current Navigation Context persists, until the request is cancelled, the session is terminated or by any other means a new request is enabled. When setting up a new Navigation Context, advantageously, the associating of Services and/or Service menus is by default copied from the most recent Navigation Context. This allows for differential, and therefore, easy scheduling.

The invention also relates to a system for scheduling the availability of such service items. Further advantageous aspects of the invention are recited in dependent claims.

BRIEF DESCRIPTION OF THE DRAWING

These and other aspects and advantages of the invention will be explained in detail hereinafter with reference to the disclosure of preferred embodiments, and in particular with reference to the appended Figures that show.

Figure 1:
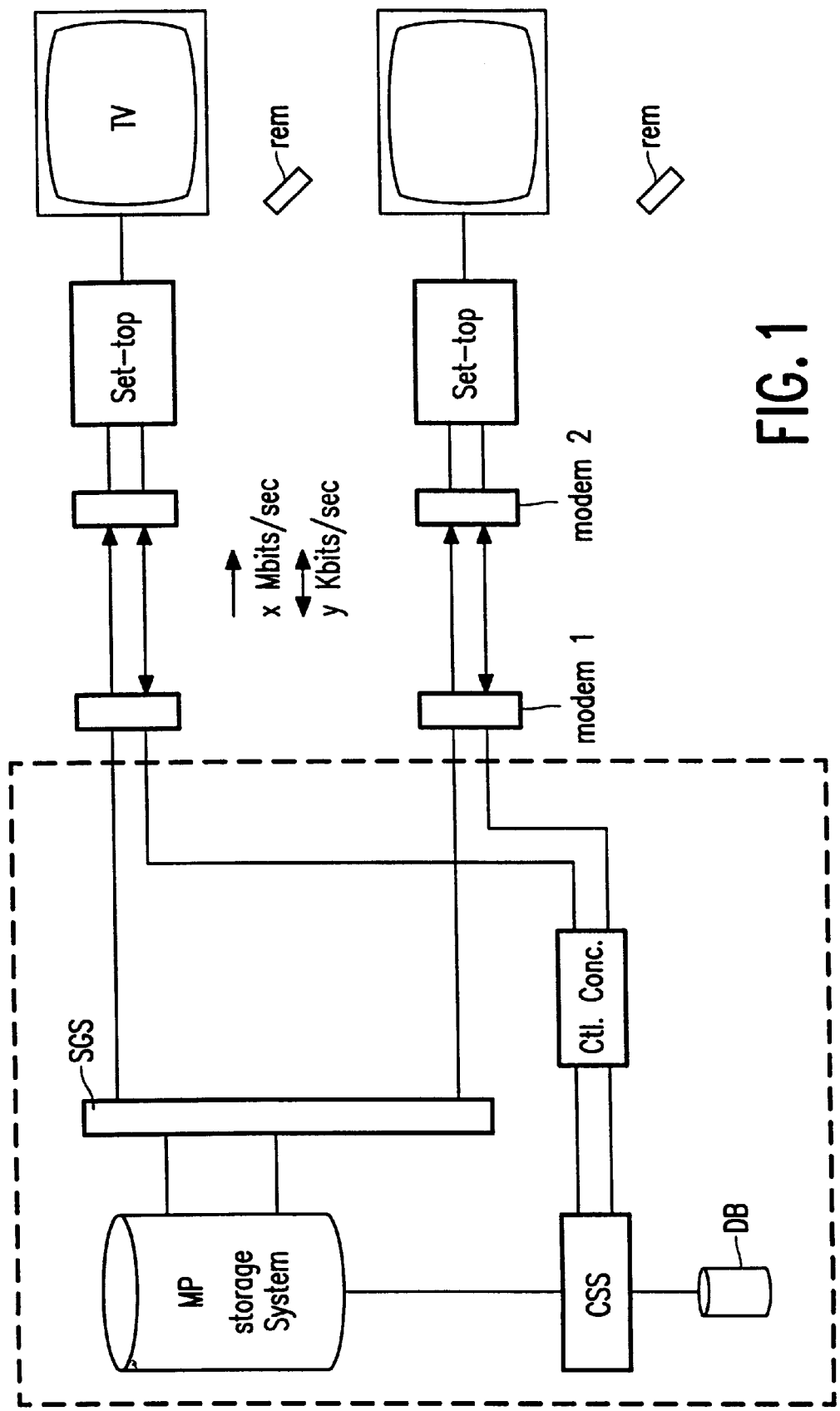
FIG. 1, a schematic hardware in a movies-on-demand system.

Table 1, a navigation context embodiment.

EXEMPLARY DEFINITIONS

Service: anything a customer may wish to use, read, view, purchase, hire, or otherwise get at his/her disposal. Examples are the viewing of movies, the playing of an interactive arcade game, reading a teletext page, making reservation for a particular service, or the accessing of an article in a home-shopping context. In the latter environment, the present invention allows for viewing the article, reading specifications thereof, effecting the ordering and the like. As far as possible, the article then is transferred via the data network. In other situations, the article or service is made available by mail, private delivery, upon presentation in person by the customer, etcetera.

NC Navigation Context: the collection of Services available at a particular instant in time. Each Navigation Context has a unique Availability Start Time or instant.

AST Availability Start Time: a particular instant in time that is assigned to a particular Navigation Context.

AS Availability Schedule: a sequence of Navigation Contexts. Only one of the Navigation Contexts in the Availability Schedule is valid at any particular instant in time. This valid NC is called the "current NC". The current NC is the NC from the Availability Schedule that has the most recent Availability Start Time. Only services in the current NC are available to a customer.

SM Service Menu: a list of Services, displayed on the TV screen or other presentation medium of the customer, from which Services the customer may choose one. A Navigation Context may contain more than one Service Menu. The various Service Menus as well as the Services themselves in a NC may be arranged in a list or in a directed graph, in particular in a tree.

CSS Control and Supervision System: the computerized system that decides on the current Navigation Context and selects a particular Service Menu; usually, it will also provide the Service proper, inasfar as the latter resides on the level of data providing or processing.

DETAILED DESCRIPTION OF PREFERRED EMBODIMENTS

Hereinafter, first a few alternatives to the solution of the invention will be briefly sketched. A first such solution operates without scheduling: therein, the service items are just loaded in some foreground subsystem of a central authority, until subsequent unloading of the item in question. A great disadvantage of this scheme is that the amending of the available repertoire can only be made instantaneously. No facility exists for making changes that will be effective at a future instant only.

A second scheme is to assign both a start date or instant and an end date or instant to each particular service item; this will render the service item available in the intermediate interval. Only a single interval can be programmed in this way, but not, for example, a daily recurring interval at fixed hours. Other, more intricate schedules are still more difficult, or even impossible to realize by this second scheme, such as an availability schedule that is non-uniform over the days of the week. Another disadvantage is that in this scheme "time" is the only qualifier of the item in question. The inventors however have experienced a need for other types of qualifiers that are linked to time only indirectly, such as the subject or other category of a particular service item. By way of example children's movies should be available for viewing only during off-school hours, which are varying among the days of the week, but on the other hand not at late-evening hours.

Now, according to a preferred embodiment of the present invention, FIG. 1 is an overall schematic of the hardware in a movies-on-demand system. As stated, other types of services are applicable as well. On a hardware level, the embodiment uses an Interactive Network Video system that has been made available by Assignee under the name Interactive Network Video. The embodiment furthermore contains a computerized Control and Supervision System CSS. The latter system may be embodied in a conventional UNIX Work Station that is commercially available from SUN Microsystems Corporation. Storage unit DB may be realized as a high density magnetic disc based storage unit.

Figure 2:
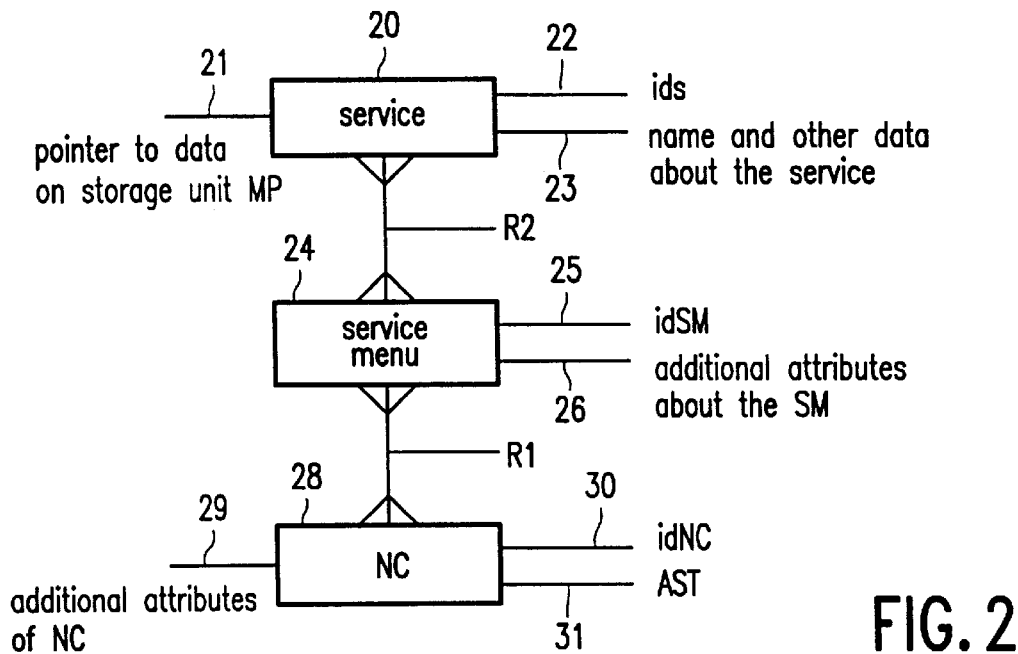
FIG. 2, the information model of an availability schedule.

Relating to the data aspects of the present invention, storage unit DB stores the Availability Schedule. The Availability Schedule consists of a sequence of Navigation Contexts. Each Navigation Context contains a number of Services Menus (FIG. 2, relation R1). Each Service Menu contains a number of Services (relation R2). Each Service may be included in a plurality of Service Menus (relation R2). The system stores relations R1 and R2 in storage unit DB. The system stores an identifier IDNC and the Availability Start Time AST of each Navigation Context in storage unit DB. The system stores an identifier IDSM, and if applicable, one or more attributes of each Service Menu in storage unit DB. The system stores an identifier IDS, a pointer to the associated data on storage unit MP, and if applicable, one or more further attributes for each Service in storage unit DB.

Storage unit MP is a high-bandwidth high density magnetic storage unit such as the MediaPool system that is commercially available from BTS Corporation, Salt Lake City, U.S.A., that is an affiliate of the present assignee. Storage unit MP contains the digitized movies or other high volume data pertaining to the available Services. A customer or other user may now request to inspect a Service Menu together with its associated Services on a local television set. A similar type of request may be generated by the service provider, or by an independent automatic data processing system. This request is transmitted to the Control and Supervision System via the local remote control device rem, the TV set, a so-called settopbox Set-top that has now become a conventional TV accessory, local modem2, central modem1 and Control concentrator CtlConc to system CSS. As indicated, the associated moderate and bidirectional control channel capacity is in the range of y kbit/sec, which is a relatively low data rate.

Upon receiving this request, system CSS calculates which Navigation Context has the most recent Availability Start Time. Thereupon, the requested Service Menu of the latter Navigation Context is retrieved therefrom, and the list or directed graph of the Services in the Service Menu is transmitted to the customer's Settop box via modem1 and modem2. This also takes place along the control channel. Subsequently, the Settop box will display the list or directed graph of Services on the customer's TV screen. Upon selection of the actual Service by the customer, the system will make this Service available. As indicated, the associated high-volume and unidirectional data channel capacity is in the range of x Mbit/sec, which is a relatively high data rate when compared with the former one. For this purpose, the system has a Stream Generation System SGS that interconnects MediaPool MP to the various modem1s. In the Settop box, the video is again separated from the control signals as far as necessary. The stream is decoded for displaying the movie in question on the Television Set.

Many different environments represent a viable field for applying the present invention. The nature of the service can be various as recited. The unsymmetric transfer characteristics shown in FIG. 1 are probable rather than an express prerequisite. The representation by a television is only an embodiment: data only or audio only are suitable for certain purposes. The transfer medium may be electrical, optical, broadcast, or even mixed.

FIG. 2 shows the information model of an availability schedule. Herein, block 20 represents the entity "Service". Pointer 21 points to the associated data on Storage Unit MP. Link 22 indicates the Service Identifier IDS. The Service can be searched for by means of this identifier. Link 23 indicates the Name of the Service and if applicable other data or qualifiers related to the Service in question. The Service can be searched for by means of the name as well as by means of these other qualifiers. Interconnection R2 symbolizes the assigning of a particular Service to a particular Service Menu 24.

Regarding the entity "Service Menu", link 25 indicates the Service Menu Identifier IDSM. The Service Menu can be searched for by means of this identifier. Link 26 indicates if applicable, data or other qualifiers related to the Service Menu in question. The Service Menu can be searched for by means of these qualifiers. Interconnection R2 symbolizes the assignability of multiple Services to a single Service menu and vice versa.

Regarding the entity "Navigation Context" 28, link 30 indicates the Navigation Context Identifier IDNC. The Navigation Context can be searched for by means of this identifier. Link 29 indicates if applicable, data or other qualifiers related to the Navigation Context in question. The Navigation Context can be searched for by means of these qualifiers. Link 31 indicates the particular Availability Starting Time for this particular Navigation Context. Interconnection R1 symbolizes the assignability of multiple Service Menus to a single Navigation Context.

Figure 3:
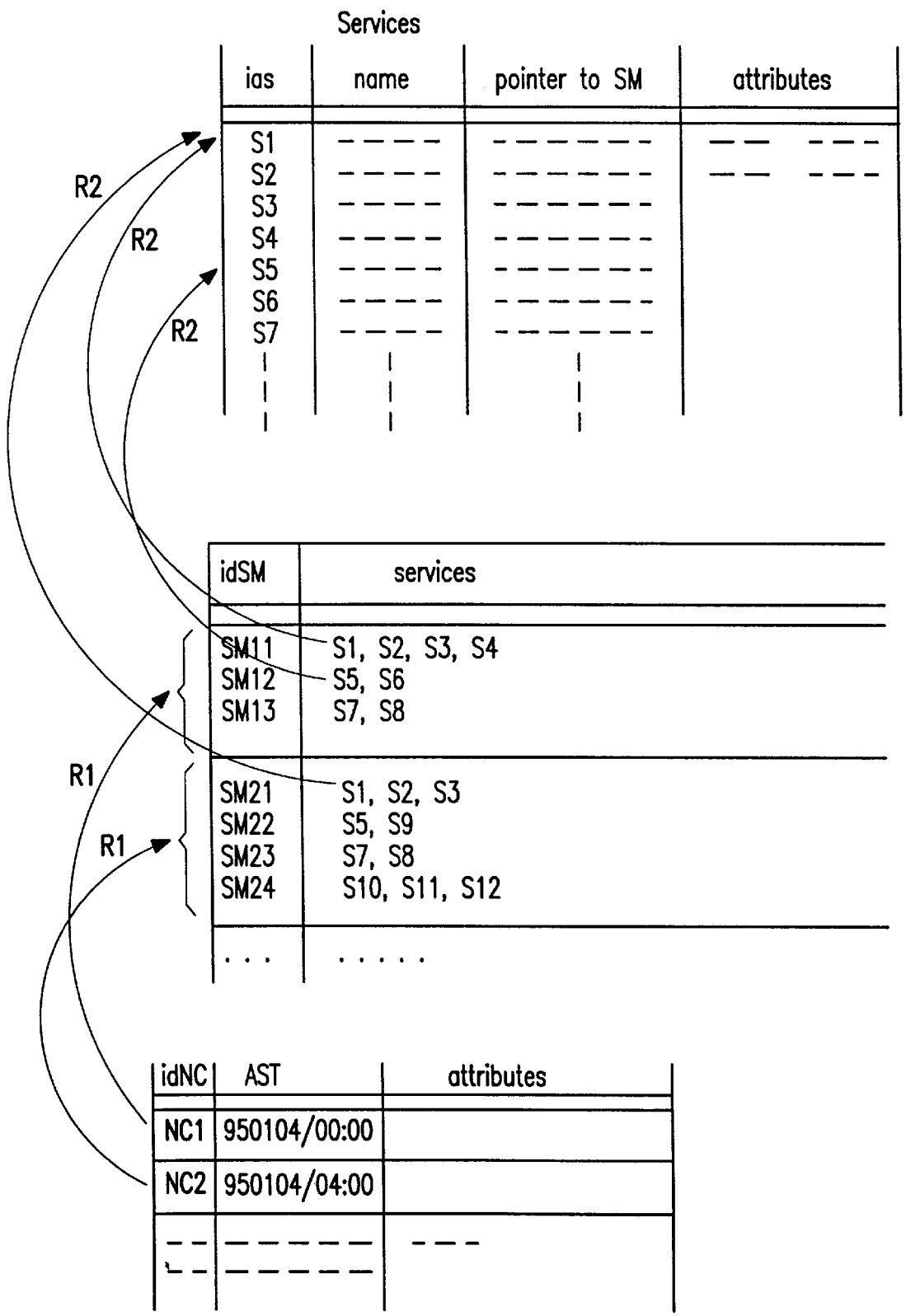
FIG. 3, an example of an availability schedule.

FIG. 3 shows an example of an availability schedule. The top item is a list of Services. Each line pertains to a particular Service. Each Service has an identifier IDS. Next, the service has a Name. The relation between a Service and a Service Menu is stored separately. Next, the Service has one or more Attributes. The pointer to the mass storage MP has not been shown. The next item is a list of Services Menus. Each line pertains to a particular Service Menu. Each Service Menu has an identifier IDSM. Furthermore, each Service Menu points to a set of one or more Services. Also, a few of the relationships R2 have been indicated by appropriate arrows. The next item is a list of Navigation Contexts. Each line pertains to a particular Navigation Context. Each Navigation Context has an identifier IDNC. Furthermore, each Navigation Context points to a set of one or more Services Menus. Also, a few of the relationships R1 have been indicated by appropriate arrows. Furthermore, each Navigation Context has one Availability Start Time, given as a date and an instant in hours and minutes. Other notations and other precisions are applicable as well. Furthermore, each Navigation Context may have one or more attributes.

Figure 4:
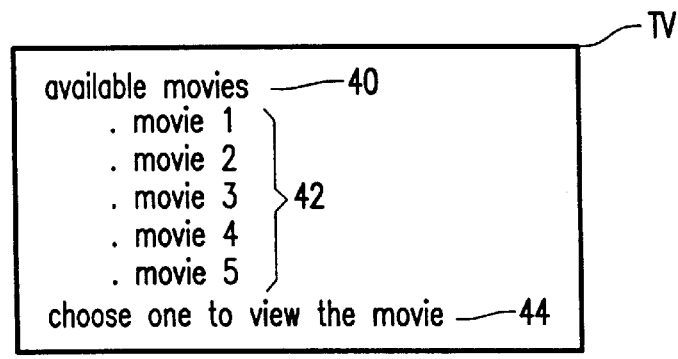
FIG. 4, a TV screen allowing a customer to select a particular movie from a list.

FIG. 4 shows a TV screen display allowing a customer to select a particular movie from a Menu. First, the display has a Menu Title 40: Available movies. Next, the menu has a sequence of lines that each identify a particular movie by its name, or by any other suitable identifier (42). Finally, the display has a user instruction 44: Choose one to view the movie. Other conventional menu control items such as 'confirm', 'cancel' etc. have been omitted for simplicity.

Table 1 shows a particular navigation context embodiment. Here, each line in the table is the name of a particular Service Menu. The Services that are assigned to these Service Menus are not shown per se. The table indicates 16 of those Service Menus, relating to movies (general), music (clips), soaps (popular melodrama), and documentaries. Each of these comes in four lists that are made available by a central authority, to wit 'general', top (chosen most often), new, and soon (not yet available, but a preview may be given). The central authority may assign a particular service item to zero, one, or more of the lists. For example, a documentary may also classify as a 'general' movie. As another example, a children's movie may be a movie spoken in the french language and classify as a 'French' film. Likewise, assignment to more than two lists is viable. Assignment to zero lists means that the item in question remains unavailable to a user. The structuring as lists means that random selectability is possible among the lists. The same randomness is available inside the various lists. The usage of directed graphs implies less random selectability, but may provide a more structured searching operation to a user.

Figure 5:
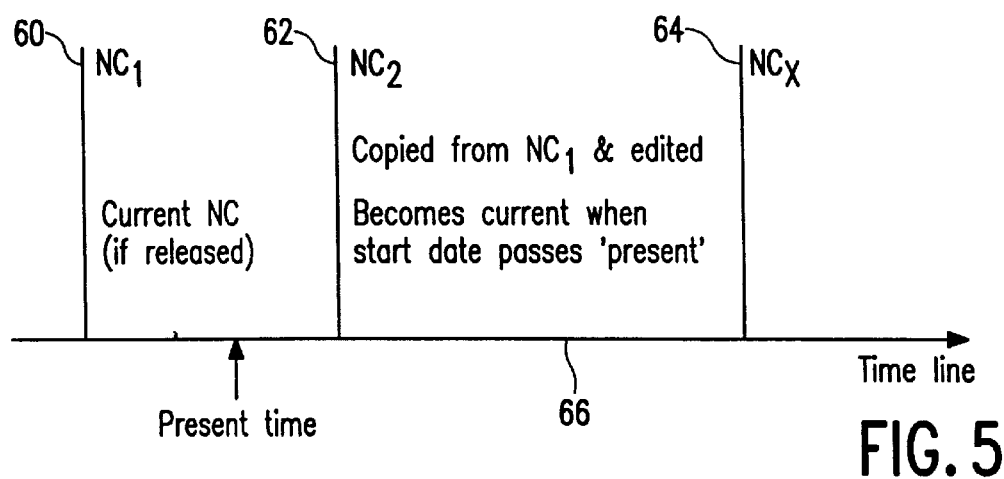
FIG. 5, a scheduling among various navigation contexts.

FIG. 5 shows the scheduling among various navigation contexts. The horizontal axis indicates time that progresses from left to right. Three start instants have been indicated at vertical lines 60, 62, 64, as having been assigned to navigation contexts NC1, NC2, NC, respectively. A Navigation Context becomes automatically effective when a user starts a new session, provided that the Navigation Context in question has the status released and also the most recent Availability Start Time. Other Navigation Contexts can be defined with Availability Start Times in the future: when the Availability Start Time is passed and the status is "released", the Navigation Context in question automatically becomes effective for new sessions. A user session, once started, always retains the Navigation Context it had started up with, and a Navigation Context can be deleted only when it is no longer in use.

In general, the operator of the system can modify the Availability Schedule in different ways:

a. The operator can insert a new Navigation Context into the existing Availability Schedule. The operator then must specify the Availability Start Time of this Navigation Context. Thereupon, the Control and Supervision System generates the Navigation Context as an exact copy of the Navigation Context that has the most recent Availability Start Time before the one of the new Navigation Context; this copying is the default operation. This action does not change the availability of the Services, because it is an exact copy. Now, the operator may proceed to actually modify the Availability Schedule by adding or removing Services in a particular Service Menu, or by adding or removing Service Menus in the Navigation Context.

b. The operator may also directly amend a Navigation Context without creation of a new navigation Context in the manner described above.

c. The operator may also remove an existing Navigation context. Upon reaching of the Availability Start Time of the removed Navigation Context, the current Navigation Context remains the same.

The embodiment can be varied while remaining in the general context of the inventive idea. For example, each service menu can be associated with zero or more information services and zero or more different service menus. This feature in effect introduces the usage of a directed graph that by itself is a well-known element of data structures. The computerized system for providing information services can be an Internet WEB site, and therein the service menus can be HTML pages that contain zero or more links to other service menus and said information services are documents that can be retrieved from this Internet WEB site. Alternatively, the computerized service can be a Teletext service, and the information service is the providing of Teletext pages.

TABLE 1

| Description | List index | Description | List index |
|---|---|---|---|
| Movies | 0 | Soaps | 8 |
| Movies Top | 1 | Soaps Top | 9 |
| Movies New | 2 | Soaps New | 10 |
| Movies Soon | 3 | Soaps Soon | 11 |
| Music | 4 | Documentaries | 12 |
| Music Top | 5 | Documentaries Top | 13 |
| Music New | 6 | Documentaries New | 14 |
| Music Soon | 7 | Documentaries Soon | 15 |

We claim:

1. In a computerized system for providing information services, including a storage system for data pertaining to the services, a method comprising:

creating and storing an inventory of the information services, including a unique identification of each information service and a reference to data required to provide the information service to a customer;

creating and storing at least one navigation context;

for each navigation context, creating and storing at least one service menu;

associating each service menu with zero or more information services;

assigning and storing a unique availability start time for each navigation context;

automatically selecting, upon request by a service provider, a service customer, or an automated system, the navigation context with the most recent availability start time, as calculated from the time of the request, to function as unique current navigation context;

making available only the service menus associated with the current navigation context, and the information services associated with these service menus.

2. In a computerized system for providing information services, including a storage system for data pertaining to the services, a method comprising:

creating and storing an inventory of the information services, including a unique identification of each information service and a reference to data required to provide the information service to a customer;

creating and storing at least one navigation context;

associating each navigation context with zero or more information services;

assigning and storing a unique availability start time for each navigation context;

automatically selecting, upon request by a service provider, a service customer, or an automated system, the navigation context with the most recent availability start time, as calculated from the time of the request, to function as unique current navigation context;

making available only the information services associated with the current navigation context.

3. A method as claimed in claim 1, wherein said associating is based on lists of items, or on trees or directed graphs each having a plurality of nodes, each node thereof accommodating one or more items.

4. A method as claimed in claim 1, wherein a current navigation context persists until cancelling of said request.

5. A method as claimed in claim 1, wherein said associating has an unmodified copying default.

6. A method as claimed in claim 1, wherein said information service pertains to any of a replaying of an audio-video item, an initiating of an interactivity session with the system or with another customer, a data transfer facility, or a facilitation to a hardware-related acquisition.

7. A method as claimed in claim 1, wherein each service menu is associated with zero or more information services and zero or more different service menus.

8. A computerized system for providing information services, including a storage system for data pertaining to the services, the system comprising:

an inventory store for the information services, including a unique identification of each information service and a reference to data required to provide the information service to a customer;

a navigation store containing at least one navigation context, each navigation context having a unique availability start time and at least one service menu, each service menu having zero or more information services;

request handling means for detecting a request by a service provider, a service customer, or by an automated system, and thereupon automatically selecting the navigation context with the most recent availability start time, as calculated from the time of the request, to function as unique current navigation context;

presentation means for making available the service menus associated with the current navigation context, and the information services associated with these service menus.

9. A computerized system for providing information services, including a storage system for data pertaining to the services, the system comprising:

an inventory store for the information services, including a unique identification of each information service and a reference to data required to provide the information service to a customer;

a navigation store containing at least one navigation context, each navigation context having a unique availability start time and zero or more information services;

request handling means for detecting a request by a service provider, a service customer, or by an automated system, and thereupon automatically selecting the navigation context with the most recent availability start time, as calculated from the time of the request, to function as unique current navigation context;

presentation means for making available service menus associated with the current navigation context, and the information services associated with these service menus.

10. A method for providing information services comprising:

creating and storing an inventory of said information services;

creating and storing at least one navigation context;

creating and storing at least one service menu for each navigation context;

associating each service menu with zero or more information services;

assigning and storing a unique availability start time for each navigation context;

automatically selecting a navigation context with the most recent availability start time; and providing a user with the ability to choose one of said information services from the service menu associated with the selected navigation context.

11. A system for providing information services using the method claimed in claim 10.

* * * * *